Figure 1:
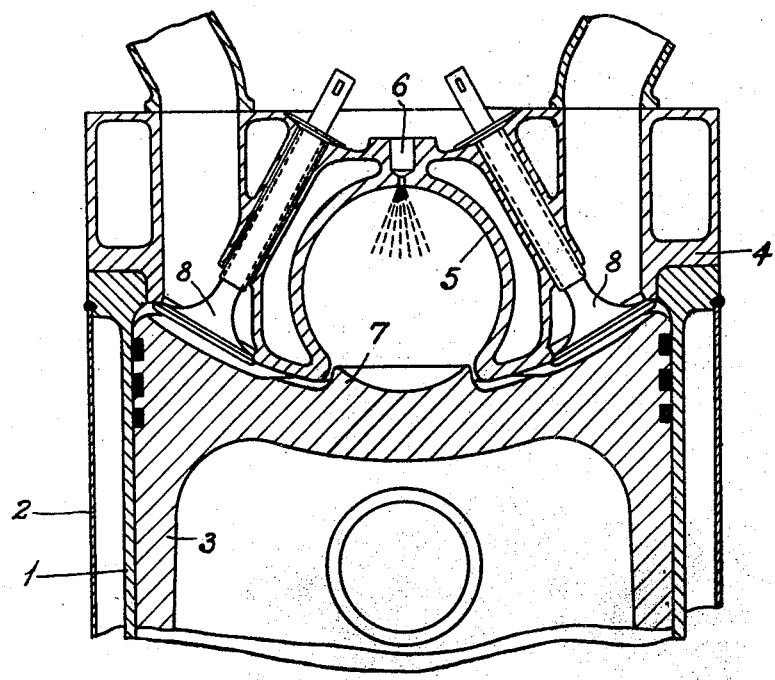

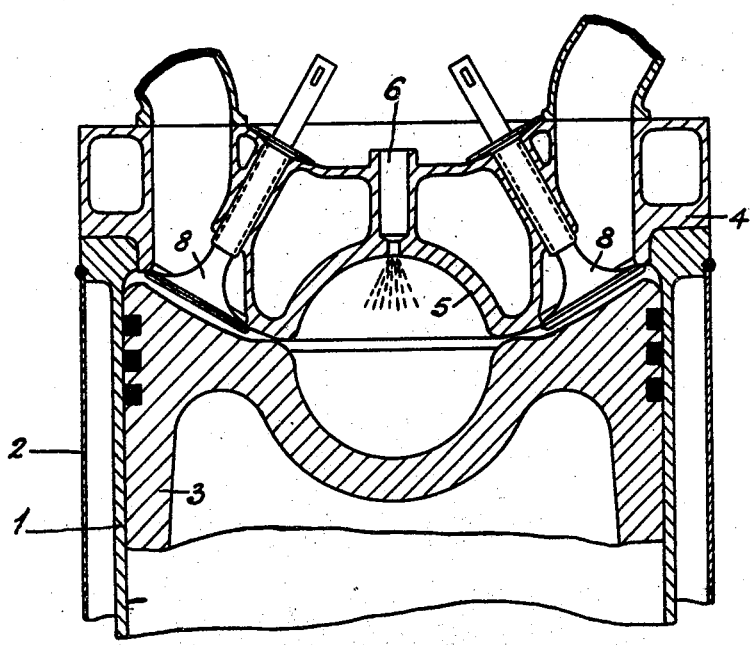

Feb. 3, 1925. 1,524,894
K. J. THOMSON ET AL
INTERNAL COMBUSTION ENGINE
Filed Oct. 13, 1921 3 Sheets-Sheet 3
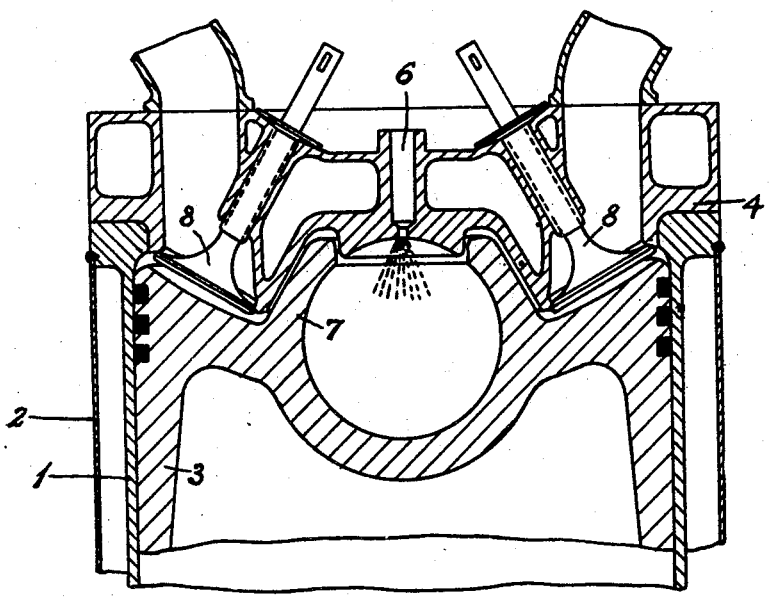
Fig: 3.
INVENTORS.
Kenneth John Thomson + Ettore Lanzerotti-Spina.
by. A. E. Osell
Attorney.

Patented Feb. 3, 1925.

1,524,894

UNITED STATES PATENT OFFICE.

KENNETH JOHN THOMSON AND ETTORE LANZEROTTI-SPINA, OF KENSINGTON, ENGLAND.

INTERNAL-COMBUSTION ENGINE.

Application filed October 13, 1921. Serial No. 507,552.

*To all whom it may concern:*

Be it known that we, KENNETH JOHN THOMSON, a subject of the King of Great Britain and Ireland, and ETTORE LANZE-ROTTI-SPINA, a subject of the King of Italy, residing at 14 Leonard Place, High Street, Kensington, W. 8, England, have invented new and useful Improvements in Internal-Combustion Engines (for which we have filed application in England on the 29th October, 1920, patent application No. 30,610/1920), of which the following is a specification.

This invention relates to internal combustion engines and especially to those in which ignition is brought about by high compression as in the well-known Diesel engine. The high temperatures that arise in such engines are harmful to the valves and valve seatings; and it is a chief purpose of this invention to protect the valves and valve seatings from these extreme temperatures. A further purpose of the invention is to enable the number and size of the valves to be largely increased, while yet the overall dimensions of the engine remain moderate. A still further purpose is to economize space in and above the head of the cylinder, and to provide for adequate cooling of the head and the valves.

With these ends in view the invention designs to locate the air inlet and exhaust valves outside the usual compression and ignition chamber. This is achieved by so shaping the cylinder head and piston that in the extreme position of the piston they form together a compression and combustion chamber of relatively large volume for its surface, said chamber having a considerable part of the surface of the head external to it and substantially cut off from it, and by locating the aforesaid valves in that surface. The piston and the cylinder head are further so shaped in relation the one to the other that the compression and combustion chamber forms the bulk of the clearance space of the engine; the piston surface approaching closely the surface of the valves, so that these momentarily are not merely substantially cut off from the compression chamber but are located in a space of small depth having much metal surface about it in proportion to its volume; and so are maintained by conduction at a relatively low temperature.

In a more complete embodiment of the invention the part of the surface of the head external to the compression chamber is made convex and preferably spherical in form, and the valves are placed substantially radial in that surface so that their stems incline together towards the outside of the cylinder. The compression chamber whether formed mainly in the head, or mainly in the piston, or partly in both, is then, as it were, nested among the valve stems and their guides, so as fully to utilize the space available in the head, and enable a large valve surface to be provided within small overhead dimensions of the engine.

Three examples of construction of the invention are illustrated in median section in the accompanying drawings.

In all the figures, 1 indicates the cylinder, 2 its water jacket, 3 the piston which is shown at the end of its stroke. 4 is the cylinder head.

In Figure 1, this head has a nearly spherical ignition chamber 5 formed within it at its centre. At the top of this chamber at 6 there is provided a fuel inlet valve of any known type suitable for the injection of a relatively heavy oil. The piston has a projecting boss 7 adapted slightly to enter the ignition chamber and complete with it a substantially spherical chamber well adapted to resist pressure. The boss 7, it will be seen, substantially separates the interior of the ignition chamber from the remainder of the cylinder and the remaining surface of the head. Moreover, at the end of the stroke, the surface of the piston is in close proximity to the surface of the head upon which the valves open, leaving between them a space of small volume in proportion to its surface area. Consequently the air inlet and the exhaust valves 8, which are arranged not in but around the ignition chamber 5, are not exposed to the high temperature which is reached at ignition. Nor are they limited in size by the comparatively restricted dimensions of the ignition chamber; their area, therefore, need not be a factor limiting the engine speed.

Preferably the surface of the cylinder head around the ignition chamber is made convex and part of a sphere, as described in our former application Serial No. 446624; and generally the construction of head may resemble that of our former application, although it is not essential to our invention that it should do so. The valve stems are arranged radially to the spherical surface so that their ends come together in convenient fashion to enable several inlet valves and several exhaust valves to be operated by a single actuating member, for instance, by two concentric plungers, as described in our former application.

The fuel inlet valve may be located in the position described in our former application for a central valve; for instance, it may extend through the two concentric plungers which operate the air inlet valves and the exhaust valves; and it may itself be operated by a third central plunger or in any known manner.

Instead of forming the ignition chamber mainly within the head, as in Figure 1, it may be formed half in the head and half in the piston in the manner shown in Figure 2; or it may be formed mainly in the piston in the manner shown in Figure 3.

What we claim is:

1. In an internal combustion engine the combination with a cylinder head of a ring of valves having their stems inclined together towards the outside of the cylinder, a fuel inlet in said head in the middle of said ring of valves, and means for substantially separating the fuel inlet from said valves at the moment of maximum compression and ignition.

2. In an internal combustion engine the combination of a cylinder head having the circumferential portion of its inner surface convex, a ring of valves arranged in said convex portion of the surface substantially radial thereto, a recessed chamber in the middle of said head, and a fuel inlet in said chamber.

3. In an internal combustion engine the combination of a cylinder, cylinder head and piston with a ring of valves in said head having their stems inclined together towards the outside of the cylinder, and a fuel inlet in the middle of said ring of valves, said head and piston being shaped to co-act together at the end of the stroke to form a substantially spherical compression and ignition chamber within and separated from said ring of valves.

4. In an internal combustion engine the combination of a cylinder, a cylinder head having an internal surface convex and substantially spherical save in its central portion, a ring of valves arranged in said convex surface substantially radial thereto, a central fuel inlet, an ignition chamber formed in said head about said inlet and constituting a part of a sphere, and a piston having its end surface substantially conforming to the surface of said head in its circumferential part, and its centre completing with the head a substantially spherical combustion chamber.

In testimony whereof we have signed our names to this specification.

KENNETH JOHN THOMSON.
ETTORE LANZEROTTI-SPINA.